Patented July 16, 1946

2,404,322

UNITED STATES PATENT OFFICE 2,404,322

ERASER COMPOSITION

Stanley H. Southard, Richmond Hill, N. Y., assignor to Sun Chemical Corporation, a corporation of Delaware No Drawing. Application July 21, 1943,
Serial No. 495,658

5 Claims. (Cl. 51—298)

This invention relates to erasers, and more particularly to erasers for use in removing marks or writings made by pencils, ink, typewriters and the like.

One of the principal objects of the present invention is to provide an eraser material prepared from substances other than rubber or synthetic rubbers.

Another object of the present invention is to provide an eraser material comprising a synthetic resin.

Another object of the present invention is to provide an eraser material comprising a synthetic resin of the polyvinyl ester type.

A still further object of the present invention is to provide an eraser material comprising a synthetic resin of the polyvinyl acetate type.

Another object of the invention is to provide a thermoplastic eraser material which may be readily formed, as by extruding, and which is sufficiently pliable or elastic to permit of its use without injury to paper or the like and in which the characteristics are so controlled that said material will have such inherent characteristics and also will have its thermoplastic characteristics so controlled that upon use as an eraser the friction will cause limited softening at the localized portion effecting the erasing so that as rubbing occurs the portion so softened by friction will remove marks or writings made by pencils, inks, typewriters and the like, without adverse effect upon the normal characteristics of the major portion of the eraser and upon cessation of the erasing friction the softened local zone will return to its original plastic characteristics to be available for additional erasing operations.

Another object is to provide such an eraser material in which the softening of the friction zone will provide a portion sufficiently adhesive and of such strength to adhere to and remove fibers and marks to be erased, but will be so limited that the main body of the eraser will retain its inherent characteristics to have sufficient strength adequately to support the softened zone, and so that the softened zone will return to its original and homogeneous characteristics with the main portion of the eraser when the frictional action ceases.

Other objects and advantages of the invention will be apparent from the following description and appended claims.

As is well known ordinary writing pencils, for example, have been provided with erasers made of rubber vulcanized to have the proper elasticity and body plasticity so that when frictionally rubbed upon paper they would remove a very thin layer of the fibrous sheet of paper along with pencil marks and the like without serious adverse effect upon the paper. Also erasers for ink and for typewritten words in which there is generally a deeper penetration have been provided of rubber having an abrasive which is coarser than such abrasive as has been incorporated in pencil erasers. I have now found that a synthetic resinous material, having a proper thermoplastic characteristic, and especially when mixed with a compatible plasticizer can be prepared which can be extruded or otherwise formed, and also can include proper abrasive, the composite material being of such character as to provide suitable elasticity and plasticity analogous to that of the rubber erasers heretofore used, and also of such character that the heat developed by friction at the localized zone which is being rubbed back and forth over the paper or the like will cause a surface or zone softening of the eraser so that it will be sufficiently adhesive by itself, or supplemented by an abrasive, to remove fibers having marks thereon without objectionable effects upon the paper, whereby results are attained substantially like those attained with the use of the former rubber erasers, long-common objects of commerce. Also this softening is the result of the heat of friction and is localized in the zone of contact during rubbing leaving the main body of the eraser with its inherent characteristics of elasticity and plasticity and adequate to support the small softened zone which is effective to accomplish the erasing results desired. The characteristics are such that when the rubbing ceases the thermoplastic material resets to its original characteristics thus permitting additional uses until it is completely worn out as has been true with rubber erasers in the past.

In operation I have found that a synthetic resinous material of the polyvinyl ester type can be satisfactorily utilized in preparing compositions intended for use as erasers. And by combining other suitable materials as hereinafter described the eraser compositions of the present invention will be so constituted that they will not soften or become sticky at prevailing normal room temperatures and have the adequate elasticity and plasticity referred to. Also the eraser compositions described are such that they soften slightly within the friction zone under rubbing which is attendant upon actual erasing operations, and yet under such conditions the eraser materials of the present invention are such that there will be sufficient strength and adhesive characteristics so that they can be satisfactorily utilized for removing marks from surfaces such as paper and the like. In addition I have found that such eraser compositions can satisfactorily be extruded so that it is possible to prepare them in the desired shape for practical use by simple mechanical extrusion processes, or by molding.

The desirable properties outlined above and possessed by the eraser compositions of the present invention make such compositions give quite satisfactory results for use in removing marks of pencil, ink, typewriter and similar marks from various surfaces.

For illustrative purposes, some examples of formulations embodying the present invention are hereinafter given of compositions which in practical commercial utilization were entirely satisfactory as eraser material.

One composition which produces an entirely satisfactory eraser for pencil and ink marks is as follows:

*Example I*

| | Parts by weight |
|---|---|
| Polyvinyl acetate | 88 |
| Dibutyl phthalate | 6 |
| Rosin | 6 |
| | 100 |

This composition, even without inclusion therein of an abrasive material, such as is ordinarily employed in the former rubber eraser compositions provides an excellent eraser for ink, pencil, typewriter and other marks. And if there is added an abrasive material to the composition described in the above example, an even greater degree of efficiency in erasing is secured. Further, the composition described in Example 1 can be readily molded or extruded into a desired shape, and this likewise is true of the above composition with added abrasive.

An illustrative composition containing an abrasive material in addition to the composition of the type described in Example 1 is the following:

*Example II*

| | Parts by weight |
|---|---|
| Polyvinyl acetate | 17.6 |
| Dibutyl phthalate | 1.2 |
| Rosin | 1.2 |
| Abrasive and coloring material | 80.0 |
| | 100.0 |

As abrasive material, any of those generally employed for such material may be used, as for example powdered silica, emery, silicon carbide known as "carborundum" and others of similar abrasive characteristics.

The eraser compositions of the above types described can satisfactorily be prepared by admixing the synthetic resinous material, dibutyl phthalate and rosin and heating the mixture until it is in a melted condition. The material then may satisfactorily be stirred until homogeneous. If desired the abrasive material and coloring agent may then be added and mixing continued until the latter materials are completely dispersed, and successful operations in practice have been effected by utilizing for the mixing operation mechanical equipment such as a ball mill or banbury mill. When the material has been mixed, as for example above described, they may then be formed to the desired shape, and such may satisfactorily be accomplished by molding in a press or by extrusion processes.

In the examples given, dibutyl phthalate may satisfactorily be replaced by any softening agent compatible with the synthetic resinous material. For example, a softening agent such as phthalic acid esters, diethyl, dimethyl, and similar esters as well as tricresyl phosphate, blown castor oil, and other softening agents may satisfactorily be employed.

The rosin of the compositions of the types described in Examples 1 and 2 gives quite satisfactory results. However, other equivalent resinous materials which are satisfactorily compatible with the polyvinyl esters of the present invention and with the softening agent utilized may be incorporated. Satisfactorily, resinous material with a fairly low melting point, that is one melting below about 125° C. may be employed.

The present invention provides an eraser composition satisfactory for utilization in removing pencil, ink and like marks from various surfaces such for example as paper and fabrics. And such results are effected in use by such eraser the composition of which comprise as an essential major ingredient a polyvinyl ester synthetic resinous material. Thus by the present invention, there is secured such satisfactory product without necessity for utilization therein of any rubber or synthetic rubber material, substances which ordinarily were heretofore used almost, if not entirely, as the essential commercial eraser composition. And by the practicing of the present invention a material is secured which completely does away with the need for such rubber or rubber-like agent, and yet in an astonishing manner adequately satisfactory results are secured in that such compositions are completely satisfactory for employment in an eraser intended for removing pencil, ink and like marks as described.

An eraser composition of the character referred to and embodying this invention will have substantially the elasticity and body at normal temperatures as the rubber erasers heretofore long in use, and yet because of its thermoplastic character it can be extruded or molded readily into such sizes or shapes as may be desired, and with abrasive material of the size requisite for satisfactory erasing operations for the particular kind of paper and marks or writing or printing thereon. This permits a ready formation of individual erasers of various sizes and shapes, while the thermoplastic conditions are such that when not subjected to heat substantially outside the range of normal room temperatures the eraser material will have the elasticity and body of the rubber erasers, as described; and will have the additional characteristic that if softened as a result of heat imparted by the friction of an erasing action, or from any other source in connection with its manufacture and use, it will reset to the desired elasticity and body when the heating effect is no longer present. While the products herein defined and the methods of producing the same constitute preferred embodiments of the invention, it is to be understood that the invention is not limited to these precise products and methods, and that changes may be made therein without departing from the scope of the invention which is defined in the appended claims.

What is claimed is:

1. An eraser composition of the character described, comprising approximately 80 parts by weight of abrasive and coloring material, 17.6 parts by weight of polyvinyl acetate, 1.2 parts by weight of dibutyl phthalate and 1.2 parts by weight of rosin, which composition at normal room temperatures has substantially the body characteristics of the rubber erasing material but will temporarily soften in a localized zone of friction in erasing while maintaining the normal characteristics of the main body of the material.

2. An eraser composition of the character described, comprising approximately 88 parts by weight of polyvinyl acetate, 6 parts by weight of dibutyl phthalate and 6 parts by weight of rosin, said admixtured composition at normal temperatures having substantially the same elasticity, flexibility, body consistency and resistance to deformation as rubber erasers heretofore generally used but having the characteristic of temporary softening under the heat generated by friction in an erasing operation upon paper and the like at temperatures substantially above room temperatures to provide a softened zone which is localized as to depth while maintaining said normal body consistency, solidity, elasticity and flexibility of the main body portion of the eraser outside said localized friction softened zone, said softened zone being changed by the friction heat to be so tacky and adhesive as to adhere to and remove writings and markings from the paper without more adverse effect thereon than occurs with use of the rubber erasers formerly used which softened zone resets to its normal thermoplastic condition at room temperatures after an erasing operation.

3. An eraser composition as defined in claim 1 in which the abrasive is silica.

4. An eraser composition as defined in claim 1 in which the abrasive is emery.

5. An eraser composition as defined in claim 1 in which the abrasive is silicon carbide.

STANLEY H. SOUTHARD.